(12) United States Patent
Cunha et al.

(10) Patent No.: US 9,909,761 B2
(45) Date of Patent: Mar. 6, 2018

(54) COMBUSTOR WALL ASSEMBLY FOR A TURBINE ENGINE

(71) Applicant: United Technologies Corporation, Hartford, CT (US)

(72) Inventors: Frank J. Cunha, Avon, CT (US); Stanislav Kostka, Shrewsbury, MA (US); Timothy S. Snyder, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 260 days.

(21) Appl. No.: 14/680,649

(22) Filed: Apr. 7, 2015

(65) Prior Publication Data

US 2015/0292741 A1 Oct. 15, 2015

Related U.S. Application Data

(60) Provisional application No. 61/977,311, filed on Apr. 9, 2014.

(51) Int. Cl.
| | |
|---|---|
| *F02C 7/28* | (2006.01) |
| *F23R 3/00* | (2006.01) |
| *F23R 3/06* | (2006.01) |

(52) U.S. Cl.
CPC .......... *F23R 3/002* (2013.01); *F02C 7/28* (2013.01); *F23R 3/005* (2013.01); *F23R 3/007* (2013.01); *F23R 3/06* (2013.01); *F23R 2900/00012* (2013.01); *F23R 2900/03042* (2013.01); *F23R 2900/03044* (2013.01); *Y02T 50/675* (2013.01)

(58) Field of Classification Search
None
See application file for complete search history.

(56) References Cited

U.S. PATENT DOCUMENTS

| | | | |
|---|---|---|---|
| 4,162,077 A | 7/1979 | Crow et al. | |
| 4,682,933 A | 7/1987 | Wagner | |
| 5,758,503 A | 6/1998 | DuBell et al. | |
| 5,799,491 A | 9/1998 | Bell et al. | |
| 2003/0010038 A1 | 1/2003 | Maghon | |
| 2005/0034399 A1* | 2/2005 | Pidcock | F23R 3/002 52/506.1 |
| 2006/0005543 A1* | 1/2006 | Burd | F23M 5/085 60/752 |
| 2009/0100838 A1* | 4/2009 | Carlisle | F23R 3/002 60/752 |
| 2010/0077764 A1 | 4/2010 | Dierberger | |
| 2013/0019603 A1* | 1/2013 | Dierberger | F23R 3/002 60/772 |
| 2014/0248120 A1* | 9/2014 | Graves | F01D 11/005 415/1 |

OTHER PUBLICATIONS

EP search report for EP15162912.8 dated Aug. 26, 2015.

* cited by examiner

*Primary Examiner* — William H Rodriguez
*Assistant Examiner* — Kyle Thomas
(74) *Attorney, Agent, or Firm* — O'Shea Getz P.C.

(57) ABSTRACT

A wall assembly of a combustor for a turbine engine includes a shell and a liner and a sealing interface structure. A cooling cavity is defined between the shell and liner and the sealing interface structure functions to minimize leakage out of the cooling cavity. The sealing interface structure may have a sealing width that is equal to or greater than twice the thickness of the liner and/or may include a chamber located between longitudinal segments of the sealing interface structure that inhibits leakage.

12 Claims, 4 Drawing Sheets

COMBUSTOR WALL ASSEMBLY FOR A TURBINE ENGINE

This application claims priority of U.S. Patent Appln. No. 61/977,311 filed Apr. 9, 2014.

BACKGROUND

The present disclosure relates to turbine engines, and more particularly, to wall assemblies of combustors.

A floating wall combustor for a turbine engine typically includes a bulkhead, an inner combustor wall assembly and an outer combustor wall assembly. The bulkhead extends radially between the inner and the outer combustor wall assemblies. Each combustor wall assembly includes a support shell and a heat shield that defines a respective radial side of a combustion chamber. Cooling cavities are defined by, and extend radially between, the heat shield and the shell. These cooling cavities fluidly couple impingement holes defined in the shell with effusion or cooling holes defined in the heat shield for cooling of the heat shield.

There is a need in the art for improved cooling effectiveness of wall assemblies to improve engine efficiency.

SUMMARY

A combustor wall assembly according to one, non-limiting, embodiment of the present disclosure includes a shell; and a liner having a thickness with a cooling cavity defined between the shell and the liner; and a sealing interface structure sealingly engaged with and carried between the shell and the liner for resisting cooling air leakage out of the cooling cavity, the sealing interface structure having a sealing width of at least twice the thickness of the liner.

Additionally to the foregoing embodiment, the cooling cavity tapers toward the sealing interface structure.

In the alternative or additionally thereto, in the foregoing embodiment, the sealing interface structure defines a re-circulation chamber.

In the alternative or additionally thereto, in the foregoing embodiment, the sealing interface structure includes an inner sealing segment and an outer sealing segment with the re-circulation chamber located between the inner and outer sealing segments.

In the alternative or additionally thereto, in the foregoing embodiment, the shell has an inner surface facing the cooling cavity and converging toward the sealing interface.

In the alternative or additionally thereto, in the foregoing embodiment, the shell is concentric to an axis, the liner includes and extends axially between opposite first and second edges both extending circumferentially, and the sealing interface structure is proximate one of the first and second edges.

In the alternative or additionally thereto, in the foregoing embodiment, the sealing interface structure includes an elongated rail attached to the liner.

In the alternative or additionally thereto, in the foregoing embodiment, the rail includes inner and outer sealing segments and defines a re-circulation chamber therebetween.

In the alternative or additionally thereto, in the foregoing embodiment, a plurality of cooling holes are spaced circumferentially from one-another, communicate through the liner, and are proximate the rail.

In the alternative or additionally thereto, in the foregoing embodiment, a plurality of impingement holes communicate through the shell and with the cooling cavity.

In the alternative or additionally thereto, in the foregoing embodiment, the sealing interface structure has a gap defined between the liner and shell that falls within the range of about zero mils to ten mils.

A combustor wall assembly according to another, non-limiting, embodiment includes a shell and a liner defining a cooling cavity therebetween; and a rail attached to the liner and including a face including a first segment in sealing association with the shell and a second segment defining in-part a recirculation chamber, wherein the recirculation chamber is configured for selective fluid communication with the cooling cavity when the shell and first segment define a gap therebetween.

Additionally to the foregoing embodiment, the rail is at a peripheral edge of the liner.

In the alternative or additionally thereto, in the foregoing embodiment, the first segment is an inner segment, the second segment is a mid segment, and the face includes an outer segment being in sealing association with the shell.

A combustor according to another, non-limiting, embodiment includes a wall assembly including at least a portion having a shell, a liner, and a cooling cavity defined between the shell and liner, wherein a plurality of impingement holes in the shell are in fluid communication with the cooling cavity and a plurality of cooling holes in the liner are in fluid communication with the cooling cavity and a combustion chamber defined at least in-part by the liner; and a sealing structure carried by the liner in sealing association with the shell for limiting cooling air leakage out of the cooling cavity, the sealing structure having a face including an inner segment, a mid segment and an outer segment, and wherein the mid segment and the shell define a chamber, the first segment is in sealing association with the shell generally between the cooling cavity and the chamber, and the second segment is in sealing association with the shell generally between the chamber and the combustion chamber.

Additionally to the foregoing embodiment, the combustor includes a bulkhead; and wherein the wall assembly includes the portion being a forward portion engaged to the bulkhead and an aft portion.

In the alternative or additionally thereto, in the foregoing embodiment, the wall assembly portion is a convergent wall assembly portion that converges toward opposite edges of the liner.

In the alternative or additionally thereto, in the foregoing embodiment, the sealing structure is located at at least one of the opposite edges.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
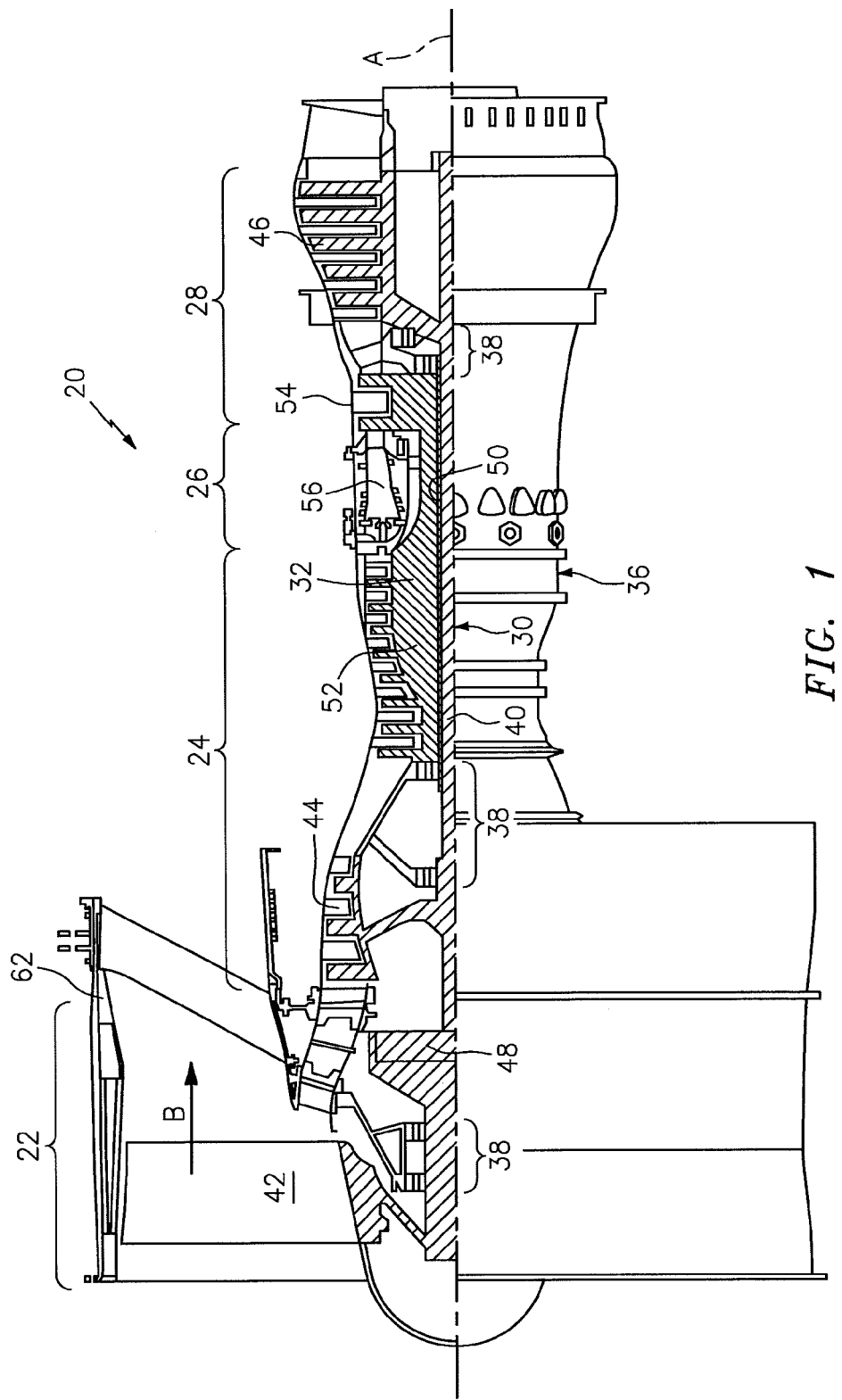
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 fps (351 m/s).

Figure 2:
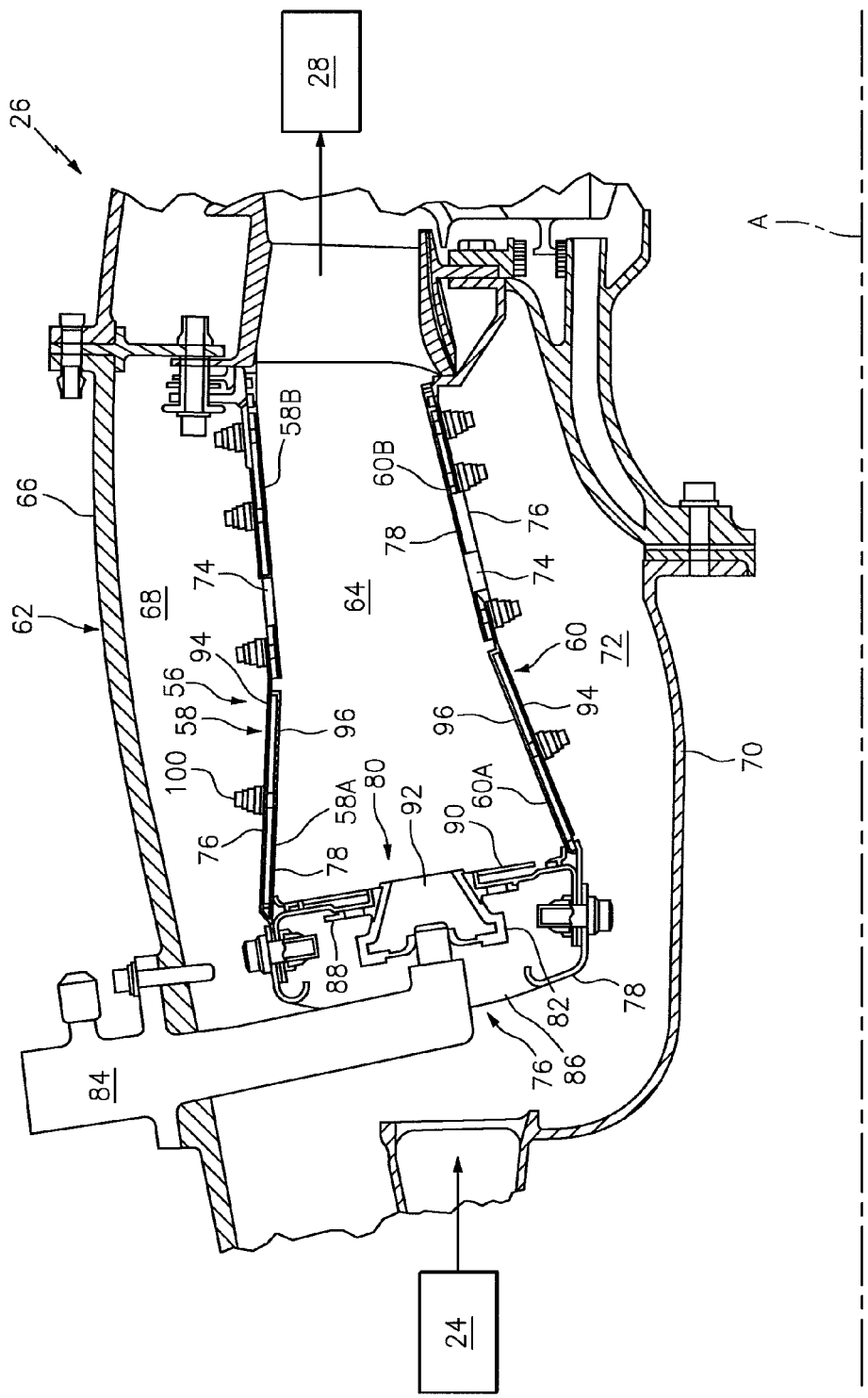
FIG. 2 is a cross section of a combustor section.

Referring to FIG. 2, the combustor section 26 generally includes an annular combustor 56 with an outer wall assembly 58, an inner wall assembly 60, and a diffuser case module 62 that surrounds wall assemblies 58, 60. The outer and inner wall assemblies 58, 60 are generally cylindrical and radially spaced apart such that an annular combustion chamber 64 is defined therebetween. The outer wall assembly 58 is spaced radially inward from an outer diffuser case 66 of the diffuser case module 62 to define an annular outer plenum 68. The inner wall assembly 60 is spaced radially outward from an inner diffuser case 70 of the diffuser case module 62 to define, in-part, an annular inner plenum 72. Although a particular combustor is illustrated, it should be understood that other combustor types with various combustor liner arrangements will also benefit. It is further understood that the disclosed cooling flow paths are but an illustrated embodiment and should not be so limited.

The combustion chamber 64 contains the combustion products that flow axially toward the turbine section 28. Each combustor wall assembly 58, 60 may be divided into a ring-shaped forward portion 58A, 60A and a ring-shaped aft or downstream portion 58B, 60B. At least one igniter (not shown) may project through the forward portion 58A of the outer wall assembly 58 for igniting a fuel and air mixture in the combustion chamber 64. A plurality of circumferentially spaced dilution holes 74 may communicate through the downstream portions 58B, 60B of the respective outer and inner wall assemblies 58, 60 for flowing dilution air from the respective plenums 68, 72 and into the combustion chamber 64 for generally improving combustion efficiency and cooling the combustion air that exits the combustor 56.

The combustor 56 further includes a forward assembly 76 that receives compressed airflow from the compressor section 24 located immediately upstream. The forward assembly 76 generally includes an annular hood 78, a bulkhead assembly 80, and a plurality of swirlers 82 (one shown). Each of the swirlers 82 are circumferentially aligned with one of a plurality of fuel nozzles 84 (one shown) and a respective hood port 86 to project through the bulkhead assembly 80. The bulkhead assembly 80 includes a bulkhead support shell 88 secured to the forward portions 58A, 60A of the respective wall assemblies 58, 60 and a plurality of circumferentially distributed bulkhead heat shields or panels 90 secured to the bulkhead support shell 88 around each respective swirler 82 opening. The bulkhead support shell 88 is generally annular and the plurality of circumferentially distributed bulkhead panels 90 are segmented, typically one to each fuel nozzle 84 and swirler 82.

The annular hood 78 extends radially between, and is secured to, the forward-most ends of the forward portion 58A, 60A of the respective wall assemblies 58, 60. Each one of the plurality of circumferentially distributed hood ports 86 receives a respective one the plurality of fuel nozzles 84, and facilitates the direction of compressed air into the forward end of the combustion chamber 64 through a swirler opening 92. Each fuel nozzle 84 may be secured to the outer diffuser case 66 of the case module 62 and projects through one of the hood ports 86 into the respective swirler 82.

The forward assembly 76 introduces core combustion air into the forward section of the combustion chamber 64 while the remainder of compressor air enters the outer annular plenum 68 and the inner annular plenum 72. The plurality of fuel nozzles 84 and adjacent structure generate a blended fuel-air mixture that supports stable combustion in the combustion chamber 64.

Figure 3:
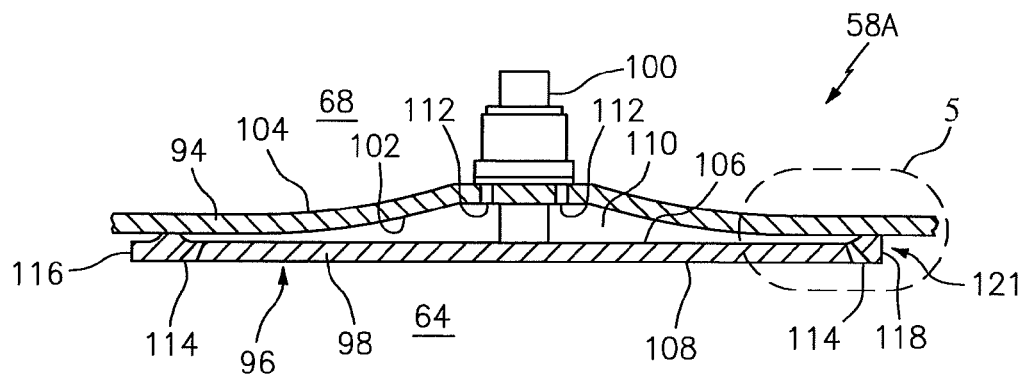
FIG. 3 is a cross section of a wall assembly of the combustor section.

Referring to FIGS. 2 and 3, each wall assembly 58, 60 includes a support shell 94 that supports one or more thermally resistant heat shields or liners 96 that define the annular combustion chamber 64. The liners 96 may be formed of a plurality of arcuate, floating, panels 98 that are generally rectilinear in cross section, manufactured of, for example, a nickel based super alloy that may be coated with a ceramic or other temperature resistant material (i.e. thermal barrier coating), and arranged to form a panel array mounted to the support shell 94. Each panel 98 of the liner 96 may be supported to the support shell 94 by at least one stanchion or threaded bolt 100 projecting rigidly from the panel 98 and through the shell 94 in such a way that limited thermal expansion and/or displacement between the shell and panel may occur.

Figure 4:
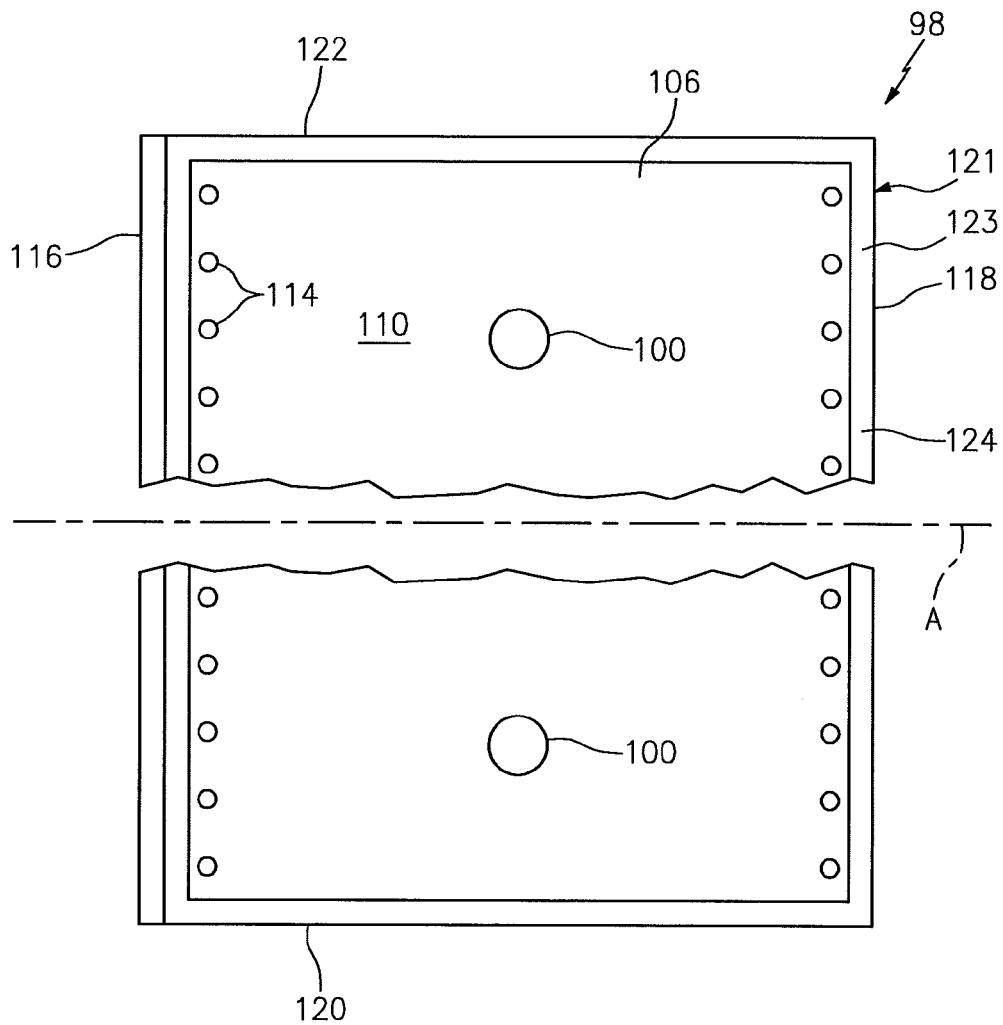
FIG. 4 is a plan view of a panel of a heat shield of the wall assembly.
Figure 5:
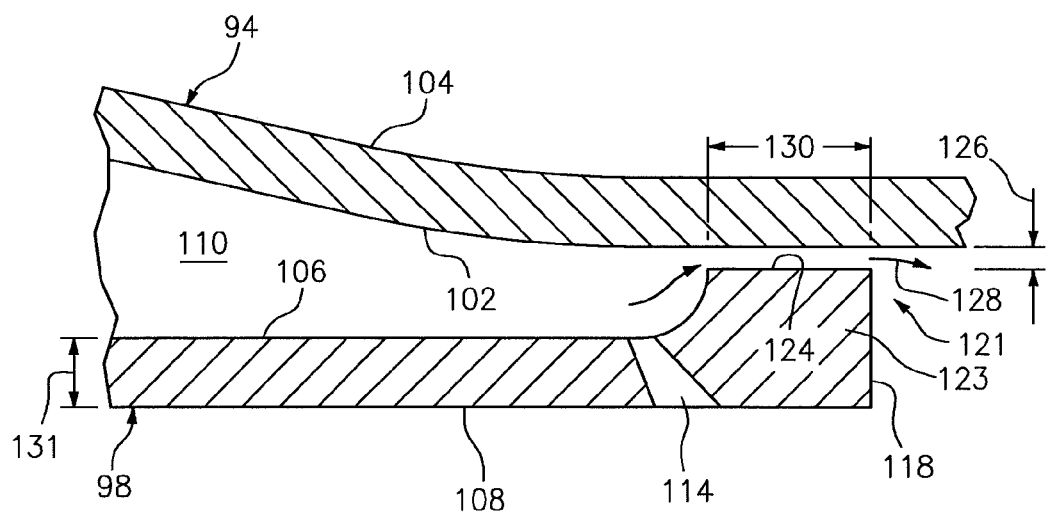
FIG. 5 is an enlarged partial view of the wall assembly taken from circle 5 of FIG. 3.

Referring to FIGS. 3 through 5, the forward portion 58A of the outer wall assembly 58 is illustrated. However, it will be appreciated that the same teaching may be applied to portion 60A, 58B, 60B of the respective wall assemblies 60, 62. The support shell 94 has an inner surface 102 and an opposite outer surface 104 which faces and defines in-part a radial boundary of the outer plenum 68. The panel 98 has a cold surface 106 and an opposite hot surface 108 facing and defining in-part a radial boundary of the combustion chamber 64. The inner surface 102 and the cold surface 106 define a cooling cavity 110 therebetween, and radially between the outer cooling plenum 68 and the combustion chamber 64.

A plurality of impingement holes 112 in the shell 94 extend through the inner and outer surfaces 102, 104 and are in fluid communication with the cooling plenum 68 and the cooling cavity 110 for flowing cooling air into the cavity 110. A plurality of film cooling holes 114 in the panel 98 extend through the cold and hot surfaces 106, 108 and are in fluid communication with the cooling cavity 110 and the combustion chamber 64 for flowing cooling air from the cavity 110 into the combustion chamber 64 that may, in-turn, form a film of cooling air over the hot surface 108 of the panel 98 for thermal protection.

The panel 98 of the liner 96 has opposite first and second edges 116, 118 that extend circumferentially with respect to the engine axis A, and opposite third and fourth edges 120, 122 that extend axially between and connect to the circumferential edges 116, 118. A sealing interface structure 121 of the wall assembly 58A may extend generally about the perimeter of the panel 98 and proximate to the edges 116, 118, 120, 122 for minimizing unwanted cooling air leakage out of the cooling cavity 110 (thither discussed below). As shown, for example, in FIG. 5, the sealing interface structure 121 may include a rail 123 projecting (e.g., laterally outward) from the cold surface 106 of the panel 98 to a face 124 carried by the rail and opposing the inner surface 102 of the shell 94.

Ideally, the face 124 of the rail 123 may be in sealing contact with the surface 102 of the shell 94. However, due to casting tolerances, manufacturing processes and, to a smaller degree, thermal displacement during engine operation, a gap (see arrow 126) may exist between the face 124 and the surface 102 of the shell 94. Such gaps 126 may range from zero to about 0.010 inches (10 mils) More specifically, about an upper limit of 0.002 inches (2 mils) may be contributable toward thermal displacement during normal operation, and about an upper limit of 0.008 inches (8 mils) may be contributable from manufacturing tolerances. In accordance with the present disclosure, the face 124 is in sealing association with the inner surface 102 of the shell 94 with or without the gap 126. Any sealing leakage (see arrow 128) that may occur during operation on account of manufacturing tolerances, wear, thermal displacement, etc., is reduced (and may be minimized) by the particular sealing engagement of the sealing interface structure of the present disclosure (with or without a gap).

Reduction or minimization of such leakage 128 is further accentuated when utilizing the 'convergent' forward portion 58A, 60A of the respective wall assemblies 58, 60 of the present disclosure. More specifically, the shell 94 may be somewhat bell-shaped with the cooling cavity 110 tapering down from a central location typically at the stanchions 100 and toward the circumferential edges 116, 118 of the panel 98. Such shape requires less cooling air provided leakage can be controlled and/or minimized. The present disclosure minimizes such leakage 128 by, for example, forming the face 124 with a lateral distance or width 130 at least about twice that of the thickness of the panel 98 (generally measured between the cold and hot surfaces 106, 108). This increased width relative to more traditional sealing interfaces creates frictional loss that induces a local pressure drop leading to a decrease in leakage flow. This decrease in leakage flow (if a gap happens to form or exist) will occur for any wall assembly (i.e. convergent or not). However, because convergent wall assemblies may be designed to utilize less cooling air, they are more sensitive or susceptible to equivalent amounts of undesired cooling air leakage. As such, convergent wall assemblies have a potential to particularly benefit from the interface structure 121 of the present disclosure.

It is further contemplated and understood that the sealing interface structure 121 may not be continuous but may instead be elongated and longitudinally extending along one of more edges of the panel 98, as one example. For instance, the sealing interface structure 121 may be one of two sealing interfaces where each interface extends only along respective circumferential edges 116, 118 of the panel 98. It is further understood that the heat shield 96 may not be divided into separate panels but may be one unitary ring. Orientation and configurations of the sealing interface structure 121 may therefore be different than that described without deviating from the novel aspects of the present disclosure.

Figure 6:
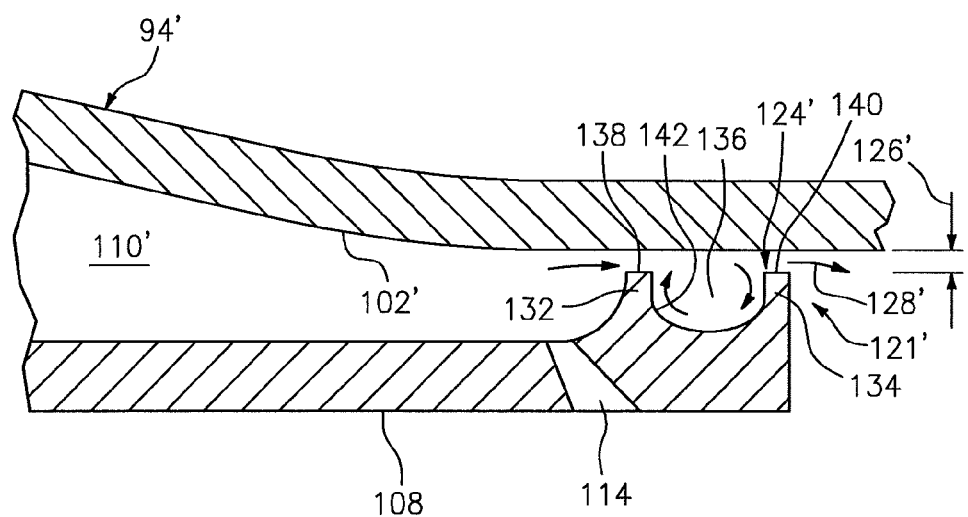
FIG. 6 is an enlarged partial view of a second embodiment of the wall assembly.

Referring to FIG. 6, a second embodiment of the present disclosure is illustrated wherein like elements to the first embodiment have like identifying numerals except with the addition of a prime symbol. A sealing interface structure 121' of the second embodiment has a continuous inner sealing segment 132 and a continuous outer sealing segment 134 both extending longitudinally and generally separated from one-another by a chamber 136 where air may recirculate. Each segment 132, 134 of the sealing interface structure 121' carries a respective inner and outer segment 138, 140 of a face 124'. The inner and outer segments 138, 140 oppose an inner surface 102' of the shell 94' and thereby define a gap 126' therebetween. A mid segment 142 of the face 124' spans laterally between the inner and outer segments, is further spaced from the inner surface 102 and defines the chamber 136 with the opposing surface.

In operation, if a gap 126 is formed, then leakage air 128' will be limited. For example, any such leakage air 128' will need to travel from a cooling cavity 110' into the gap 126' between the inner surface 102' and the inner segment 138 of the face 124'. From there, the leakage air would need to additionally enter the chamber 136 where the air may be guided to recirculate upon itself or otherwise create an airflow turbulence that produces a backpressure which minimizes air leakage. Such leakage air 128' would further need to re-enter the gap 126' between the outer segment 140 of the face 124' and the inner surface 102' of the shell 94' where the limited leakage air may then enter the combustion chamber 64'. It is contemplated and understood that although the cross section of the mid segment 142 is curved or cupped (e.g., concave), any number of cross sectional profiles of the mid segment 142 will work provided a chamber is defined where air may generally recirculate.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A combustor wall assembly comprising:
a shell;
a liner having a thickness with a cooling cavity defined between the shell and the liner; and
an elongated rail sealingly engaged with and carried between the shell and the liner for resisting cooling air leakage out of the cooling cavity;
the elongated rail and the liner being integrally formed and the elongated rail comprising an inner sealing segment and an outer sealing segment with a re-circulation chamber located between the inner and outer sealing segments; and
the shell comprising an inner surface, the inner surface facing the cooling cavity and converging towards the liner as the inner surface extends towards the elongated rail.

2. The combustor wall assembly set forth in claim 1, wherein the cooling cavity tapers toward the elongated rail.

3. The combustor wall assembly set forth in claim 1, wherein the shell is concentric to an axis, the liner includes and extends axially between opposite first and second edges both extending circumferentially, and the elongated rail is proximate one of the first and second edges.

4. The combustor wall assembly set forth in claim 1, wherein a plurality of cooling holes are spaced circumferentially from one-another, communicate through the liner, and are proximate the elongated rail.

5. The combustor wall assembly set forth in claim 4, wherein a plurality of impingement holes communicate through the shell and with the cooling cavity.

6. The combustor wall assembly set forth in claim 1, wherein a gap is defined between the liner and shell at the elongated rail that falls within the range of zero mils to ten mils.

7. A combustor wall assembly, comprising:
a shell and a liner defining a cooling cavity therebetween;
the liner comprising a rail and a surface;
the rail integrally formed with the liner and projecting out from the surface to a face; and
the face including an inner segment and an outer segment in sealing association with the shell and a mid segment spanning laterally between the inner and outer segments, wherein the inner segment, mid segment and outer segment define a recirculation chamber;
wherein the recirculation chamber is configured for selective fluid communication with the cooling cavity when the shell and the inner segment define a gap therebetween.

8. The combustor wall assembly set forth in claim 7, wherein the rail is at a peripheral edge of the liner.

9. A combustor comprising:
a wall assembly including at least a portion having a shell, a liner, and a cooling cavity defined between the shell and liner, wherein a plurality of impingement holes in the shell are in fluid communication with the cooling cavity and a plurality of cooling holes in the liner are in fluid communication with the cooling cavity and a combustion chamber defined at least in-part by the liner; and
a sealing structure carried by and formed as an integral member of the liner in sealing association with the shell for limiting cooling air leakage out of the cooling cavity, the sealing structure having a face including an inner segment, a mid segment and an outer segment, and
wherein the mid segment and the shell define a recirculation chamber, the inner segment is in sealing association with the shell generally between the cooling cavity and the recirculation chamber, and the outer segment is in sealing association with the shell generally between the recirculation chamber and the combustion chamber.

10. The combustor set forth in claim 9 further comprising:
a bulkhead; and
wherein the wall assembly includes the portion being a forward portion engaged to the bulkhead and an aft portion.

11. The combustor set forth in claim 10, wherein the wall assembly portion is a convergent wall assembly portion that converges toward opposite edges of the liner.

12. The combustor set forth in claim 11, wherein the sealing structure is located at at least one of the opposite edges.

* * * * *